United States Patent
Mashio et al.

(10) Patent No.: US 10,049,588 B2
(45) Date of Patent: Aug. 14, 2018

(54) COMPUTER SYSTEM FOR DETERMINING APPROACH OF AIRCRAFT AND AIRCRAFT

(71) Applicant: MITSUBISHI AIRCRAFT CORPORATION, Aichi (JP)

(72) Inventors: Tomoka Mashio, Aichi (JP); Kotaro Tomida, Aichi (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 0 days.

(21) Appl. No.: 15/228,475

(22) Filed: Aug. 4, 2016

(65) Prior Publication Data
US 2017/0039863 A1   Feb. 9, 2017

(30) Foreign Application Priority Data

Aug. 6, 2015   (JP) ................... 2015-155990
Sep. 15, 2015  (JP) ................... 2015-181554

(51) Int. Cl.
*G08G 5/02*   (2006.01)
*B64C 25/28*  (2006.01)
(Continued)

(52) U.S. Cl.
CPC .............. *G08G 5/02* (2013.01); *B64C 25/28* (2013.01); *B64D 45/04* (2013.01); *G01C 5/005* (2013.01);
(Continued)

(58) Field of Classification Search
CPC .................... G08G 5/02; G05D 1/00
See application file for complete search history.

(56) References Cited

U.S. PATENT DOCUMENTS

| 4,319,218 A | 3/1982 | Bateman |
| 5,638,282 A * | 6/1997 | Chazelle .............. G01C 21/005 340/970 |

(Continued)

FOREIGN PATENT DOCUMENTS

| EP | 2384973 A2 | 11/2011 |
| JP | 2001-033271 A | 2/2001 |

OTHER PUBLICATIONS

European Search Report for Patent Application No. 16182320.8 dated Dec. 19, 2016.

*Primary Examiner* — Adam D Tissot
*Assistant Examiner* — Alex C Dunn
(74) *Attorney, Agent, or Firm* — Pearne & Gordon LLP

(57) ABSTRACT

A computer system 20 provided in an aircraft 1 includes, as a module of a computer program to be executed, an approach determination section 31 configured to determine whether the aircraft 1 is approaching a landing site. The approach determination section 31 includes, as a condition for determination of approaching, establishment (C1) of one or both of a condition (C11) that a first absolute altitude A1 obtained by an radio altimeter 21 mounted on the aircraft 1 is low relative to a first approach altitude AA1, and a condition (C12) that a second absolute altitude A2 that is obtained by subtracting an altitude $A_L$ of the landing site from a pressure altitude Ap determined by a barometric altimeter 22 mounted on the aircraft 1 is low relative to a predetermined second approach altitude AA2.

12 Claims, 6 Drawing Sheets

(51) Int. Cl.
   *B64D 45/04*   (2006.01)
   *G01C 5/00*   (2006.01)
   *G01S 13/88*   (2006.01)
   *G08G 5/00*   (2006.01)

(52) U.S. Cl.
   CPC .......... *G01S 13/882* (2013.01); *G08G 5/0021* (2013.01); *G08G 5/025* (2013.01)

(56) References Cited

U.S. PATENT DOCUMENTS

| | | | |
|---|---|---|---|
| 6,043,758 A * | 3/2000 | Snyder, Jr. ............. | G01O 5/005 340/945 |
| 6,157,891 A * | 12/2000 | Lin ...................... | G01O 5/005 244/180 |
| 6,347,263 B1 * | 2/2002 | Johnson ................ | G01O 5/005 340/970 |
| 6,622,066 B2 * | 9/2003 | Ishihara ................ | G01O 5/005 340/945 |
| 7,389,164 B1 | 6/2008 | Conner et al. | |
| 9,262,932 B1 * | 2/2016 | Barber ................ | G08G 5/0021 |
| 2002/0069019 A1 * | 6/2002 | Lin ...................... | G05D 1/0055 701/301 |
| 2002/0099478 A1 * | 7/2002 | Ishihara ................ | G01O 5/005 701/9 |
| 2005/0156777 A1 * | 7/2005 | King ...................... | G01S 3/023 342/29 |
| 2009/0289834 A1 * | 11/2009 | Devensky ............... | G01S 13/34 342/122 |
| 2013/0204523 A1 * | 8/2013 | He ...................... | G08G 5/0021 701/527 |
| 2015/0150095 A1 * | 5/2015 | Mere ...................... | G05D 1/00 726/4 |
| 2016/0155341 A1 * | 6/2016 | Gannon ............... | G08G 5/0056 701/16 |

* cited by examiner

COMPUTER SYSTEM FOR DETERMINING APPROACH OF AIRCRAFT AND AIRCRAFT

BACKGROUND OF THE INVENTION

Field of the Invention

The present invention relates to a computer system having a function of determining approach of an aircraft, and to an aircraft.

Description of the Related Art

The landing gear of the aircraft is deployed in approach to an airport landing runway, and supports the landed airframe. If the landing gear is not deployed downward in approaching, a warning is given to the pilot. Thus, it is necessary to determine whether the aircraft is approaching.

As the peripheral technology thereof, a Ground Proximity Warning System (GPWS) disclosed in Japanese Patent Laid-Open No. 2001-033271 (paragraphs [0002] to [0006] and FIG. 1) is known. The Ground Proximity Warning System determines approaching state to the ground surface, based on measurement data by a radio altimeter, an air data computer, and a global positioning system (GPS), three-dimensional topography data, and other data, and then issues a warning.

An index to be used for electrical determination whether the aircraft is approaching is not precisely defined. As an index of the determination, for example, positions of flaps and slats are considerable; however, determination whether the aircraft is approaching or in other flight phases such as takeoff, initial climbing, and descending cannot be made only by the positions of the flaps and slats. Thus, it is necessary to consider flight altitude of the aircraft and other factors.

Using a plurality of altimeters is effective to improve reliability of approach determination using the flight altitude; however, addition of devices directly causes weight increase of the aircraft. If the number of mounted altimeters is reduced, it is possible to easily reduce the weight of the aircraft as compared with a case where the weight to be reduced of the airframe structure is derived from aerodynamic load and reduced.

Accordingly, an object of the present invention is to determine approach of the aircraft while avoiding weight increase of the aircraft and securing reliability of approach determination.

SUMMARY OF THE INVENTION

A computer system included in an aircraft according to the present invention includes, as a module of a computer program to be executed, an approach determination section configured to determine whether the aircraft is approaching a landing site.

The approach determination section includes, as a condition for determination of approaching, establishment of one or both of a first condition and a second condition in determination. The first condition is based on a first absolute altitude determined by a radio altimeter mounted on the aircraft, and the second condition is based on a second absolute altitude that is obtained by subtracting an altitude of the landing site from a pressure altitude determined by a barometric altimeter mounted on the aircraft.

In the present invention, determination whether the aircraft is approaching is performed with use of the second absolute altitude obtained from the pressure altitude and the landing site altitude. The pressure altitude is determined by the barometric altimeter that is an essential device for flight of the aircraft. The landing site altitude is provided to the computer system during the flight. Thus, it is possible to determine whether the aircraft is approaching while suppressing the weight of the aircraft and securing reliability of the approach determination by redundancy of the measurement system of the radio altimeter and the measurement system of the barometric altimeter, with use of a single radio altimeter.

The radio altimeter and the barometric altimeter are different in measurement principle and configuration from each other, which hardly causes measurement failure and breakage on both altimeters. Therefore, even if measurement failure or breakage occurs on one of the altimeters, the altitude determined by the other altimeter is used, which makes it possible to improve reliability of the approach determination.

In the present invention, the first condition may be established when the first absolute altitude determined by the radio altimeter that is mounted on the aircraft is low relative to a predetermined first approach altitude. The second condition may be established when the second absolute altitude that is obtained by subtracting the altitude of the landing site from the barometric altimeter determined by the barometric altimeter mounted on the aircraft is low relative to a predetermined second approach altitude.

The first approach altitude and the second approach altitude are each absolute altitude corresponding to a distance from the ground surface to the aircraft.

"The first absolute altitude (or the second absolute altitude) is low relative to the approach altitude" used herein means that the first absolute altitude (or the second absolute altitude) is lower than the approach altitude, or the first absolute altitude (or the second absolute altitude) is equal to or lower than the approach altitude.

In the present invention, the second approach altitude is preferably higher than the first approach altitude.

This establishes the second condition even if the second absolute altitude is shifted to higher side in association with pressure variation. Thus, approaching is correctly reflected to the second condition to correctly perform approach determination.

In the present invention, the approach determination section may be configured to further include, as the condition to determine whether the aircraft is approaching, establishment of a third condition that is based on an absolute altitude determined by another radio altimeter mounted on the aircraft, in addition to one or both of the first condition and the second condition.

Accordingly, the altitude measurement system is triplicated by the two radio altimeters and the barometric altimeter, which makes it possible to further improve reliability of the approach determination.

The present invention preferably includes, as the modules, a landing gear state detection section configured to detect an up state or a down state of landing gear provided in the aircraft, and a warning signal output section configured to output a signal relating to a warning when the approach determination section determines that the aircraft is approaching as well as the landing gear state based on a detection result of the landing gear state detection section is not the down state.

This makes it possible to issue a warning with respect to approaching without the landing gear being lowered down.

"The landing gear state is not the down state" means one or both of the fact that the position of the handle controlling up and down of the landing gear does not indicate the position of the down operation and the fact that the landing gear is not lowered down to the down position.

An aircraft according to the present invention includes the above-described computer system, the above-described barometric altimeter, and the above-described radio altimeter.

According to the present invention, it is possible to determine approach of the aircraft while avoiding weight increase of the aircraft and securing reliability of the approach determination.

DETAILED DESCRIPTION OF THE PREFERRED EMBODIMENT

In the following, an aircraft according to an embodiment of the present invention is described with reference to accompanying drawings.

Figure 1:
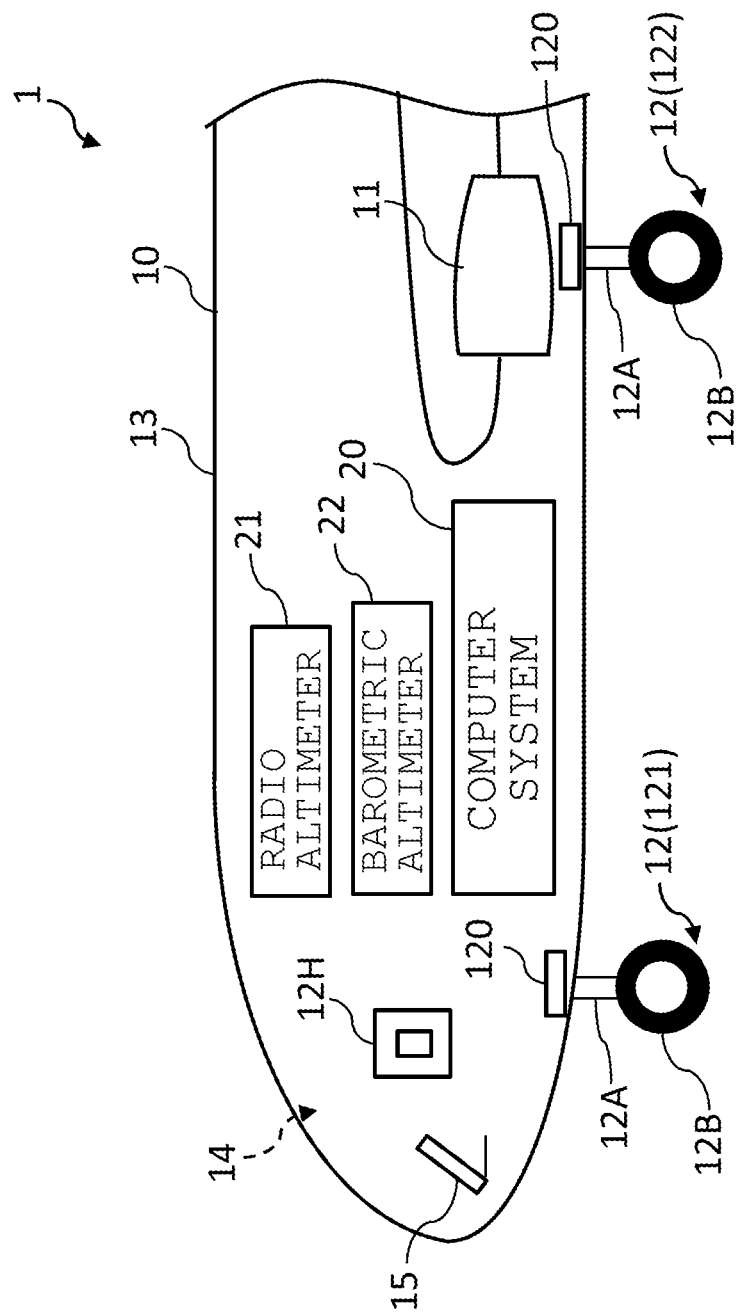
FIG. 1 is a schematic diagram illustrating a configuration relating to approach determination of an aircraft according to an embodiment of the present invention.

An aircraft 1 illustrated in FIG. 1 includes: an airframe 10; an engine 11 provided in the airframe 10; landing gear 12 supporting the airframe 10; and a computer system 20 that has a function of determining approach of the aircraft 1.

The computer system 20 includes a single or a plurality of computers each including a calculation device and a memory device, and performs input and output of various kinds of data and necessary calculation, based on computer programs. The aircraft 1 includes a plurality of computer systems in addition to the computer system 20, and also includes a hydraulic system that causes flight control surfaces and various kinds of devices to operate. These systems are operated in cooperation with one another for appropriate processing in the aircraft 1 in terms of safety and efficiency.

Various devices are mounted on the airframe 10. As examples of devices, a radio altimeter 21 and a barometric altimeter 22 that are mounted on the airframe 10 are illustrated in FIG. 1. The radio altimeter 21 and the barometric altimeter 22 may be disposed at respective optional positions of the airframe 10.

In the present embodiment, an altitude determined by the radio altimeter 21 and an altitude determined by the barometric altimeter 22 are used to determine approach of the aircraft 1.

The radio altimeter 21 emits a radio wave toward a ground surface, and determines an absolute altitude that is a distance from the ground surface to the aircraft 1, based on correlation between the emitted radio wave and a radio wave reflected by the ground surface.

The radio altimeter 21 measures receivable altitude of the radio wave that has been emitted from the aircraft 1 and then reflected by the ground surface, with high accuracy irrespective of pressure variation.

The altitude determined by the radio altimeter 21 is referred to as a first absolute altitude.

In contrast, the barometric altimeter 22 converts a pressure outside the aircraft 1 (outside pressure) at the time into a height to determine an altitude, with reference to relationship between a pressure and an altitude of normal atmosphere. The outside pressure used at this time is a static pressure measured by a static hole provided in the aircraft 1. The actual relationship between the pressure and the altitude varies depending on weather conditions. Thus, a pressure altitude correction value that is specified for each airspace is set to correct the altitude.

The altitude determined by the barometric altimeter 22 is referred to as a pressure altitude.

The pressure altitude is used for control by a pilot, flight control by the computer system, and the like.

When landing, the aircraft 1 enters a flight phase called approach in which the aircraft 1 descends from the upper sky and performs predetermined processes such as lowering down of the landing gear 12, toward the landing point. At this time, the reference of the altitude used in approach determination is the altitude of the ground surface. The pressure altitude determined by the barometric altimeter 22 indicates sea level altitude with reference to a mean sea level, and the sea level altitude is typically greater than the altitude of the ground surface of the land.

Therefore, altitude data of the landing site that is held by the computer system 20 is used, and the absolute altitude from the ground surface of the landing site to the aircraft 1 is used for the approach determination. The absolute altitude is obtained by subtracting the altitude of the landing site from the pressure altitude. The altitude of the landing site indicates an altitude (elevation) from the mean sea level, as with the pressure altitude.

The absolute altitude that is obtained by subtracting the altitude of the landing site from the pressure altitude is referred to as a second absolute altitude.

The altitude data of the landing site is held by the memory device of the computer system 20.

The altitude of the landing site indicates an altitude corresponding to a destination airport.

The altitude of the landing site corresponding to the destination airport is transmitted to the computer system 20 before the flight, by the computer system such as flight management system (FMS). In a case of emergency landing, the altitude corresponding to the airport at which the aircraft 1 makes the emergency landing is transmitted anew.

The landing gear 12 is a general term of a front landing gear 121 that is located on front side of a body 13, and a main landing gear 122 that is located at a center part of the body 13.

The landing gear 12 includes: a shock support column 12A that absorbs shock load in landing and vibration load in running; a wheel 12B that is provided on the shock support column 12A; and an unillustrated brake that brakes the wheel 12B.

The landing gear 12 is lifted up and lowered down through operation of a handle 12H in a cockpit 14. A down operation in which the landing gear 12 is lowered down toward the ground surface and an up operation in which the landing gear 12 is lifted up into an unillustrated storage bay of the airframe 10 are performable by the handle 12H.

The landing gear 12 is lifted up and locked to an up position by a landing gear actuating apparatus 120 so as not to move until the flying aircraft 1 starts approach toward the landing site. Then, when the handle 12H in the cockpit 14 is subjected to the down operation and an electric signal instructing extension of the landing gear 12 is accordingly transmitted to the landing gear actuating apparatus 120, the landing gear 12 is unlocked from the up position and is deployed downward by an actuator. The landing gear 12 is so locked at a down position as not to move.

When the computer system 20 determines that the aircraft 1 is approaching while the landing gear 12 is not lowered down, the computer system 20 outputs a warning signal to give the pilot a warning.

Figure 2:
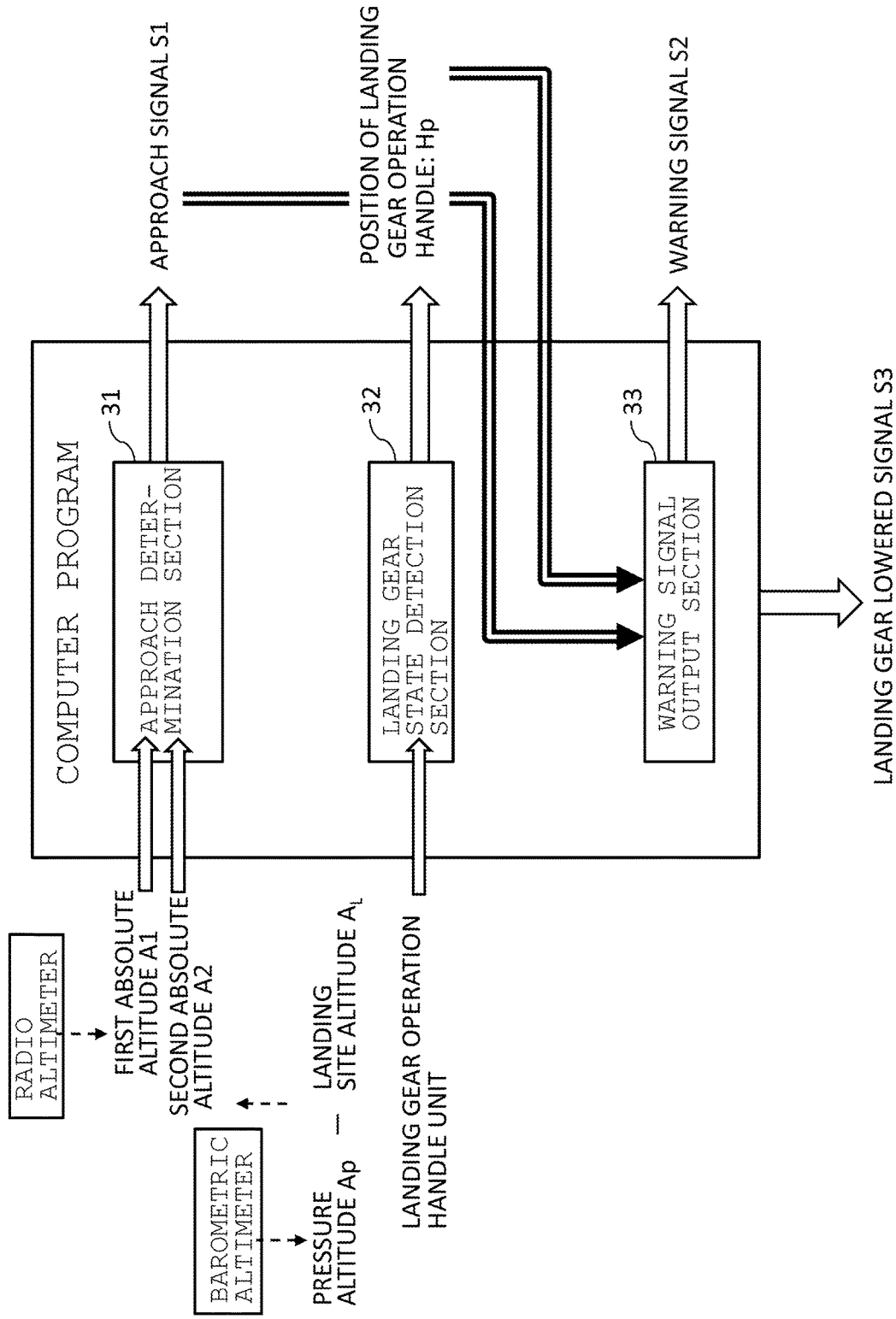
FIG. 2 is a block diagram illustrating some of modules of a program executed by a computer system in FIG. 1.

Thus, as illustrated in FIG. 2, the computer system 20 includes, as modules of the computer program to be executed, an approach determination section 31, a landing gear state detection section 32, and a warning signal output section 33 that outputs the warning signal. FIG. 2 illustrates input and output of data related to the approach determination section 31, the landing gear state detection section 32, and the warning signal output section 33.

The approach determination section 31 determines whether the aircraft 1 is approaching during the flight of the aircraft 1. When determining that the aircraft 1 is approaching, the approach determination section 31 outputs an approach signal S1.

The present embodiment has a main feature in processing by the approach determination section 31.

Figure 3:
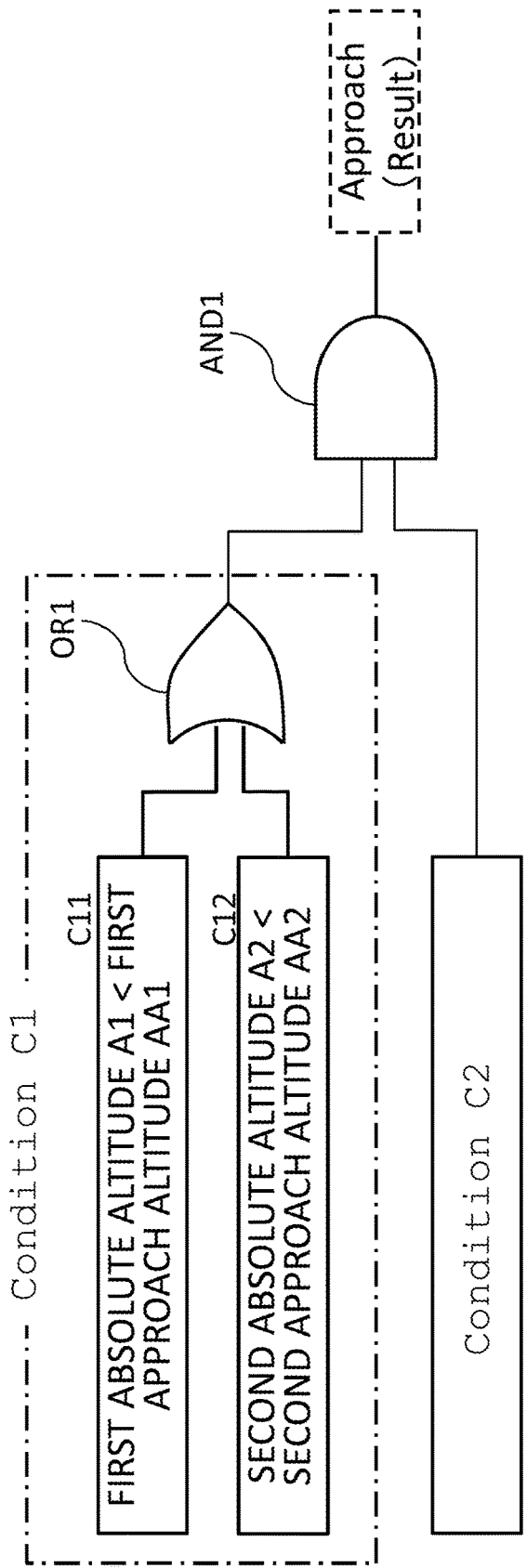
FIG. 3 is a diagram illustrating logic used by an approach determination section.

The approach determination section 31 determines whether the aircraft 1 is approaching, with use of logic illustrated in FIG. 3.

To determine approaching, a first absolute altitude A1 that is determined by the radio altimeter 21 and a second absolute altitude A2 that is obtained by subtracting the altitude of the landing site from a pressure altitude Ap determined by the barometric altimeter 22 are used in the present embodiment.

When a condition C1 in which the aircraft 1 is flying with a predetermined approach altitude that is distinguished to be approaching is established by the first absolute altitude A1 or the second absolute altitude A2, as well as another condition C2 is established, the approach determination section 31 determines that the aircraft 1 is approaching (Result).

The condition C1 includes a condition C11 relating to the radio altimeter 21 and a condition C12 relating to the barometric altimeter 22.

The condition C11 is established when the first absolute altitude A1 is low relative to a predetermined first approach altitude AA1.

The condition C12 is established when the second absolute altitude A2 is low relative to a predetermined second approach altitude AA2.

The first approach altitude AA1 and the second approach altitude AA2 are set to respective absolute altitudes at which it is determined that the aircraft 1 sufficiently lowers the altitude by descending to start approaching.

The first approach altitude AA1 may have a value equal to a value of the second approach altitude AA2; however, the second approach altitude AA2 that is to be compared with the second absolute altitude A2 based on the pressure altitude Ap may be favorably higher than the first approach altitude AA1. This establishes the condition C12 even when the second absolute altitude A2 is shifted to higher side in association with pressure variation. Thus, approaching is reflected to the condition C12 correctly.

When at least one of the condition C11 and the condition C12 is established, the condition C1 relating to the altitude is established by virtue of a logical add (OR) gate OR1.

When both of the condition C1 and the condition C2 are established, it is determined that the aircraft 1 is approaching (Result) by virtue of a logical product (AND) gate AND1.

In the case where the two absolute altitudes A1 and A2 that are respectively obtained by the two different altimeters 21 and 22 are used to determine whether the aircraft 1 is approaching as with the present embodiment, even if one of the altitudes has large error or one of the altimeters cannot determine altitude due to failure, it is possible to determine whether the aircraft 1 is approaching, with use of the altitude determined by the other altimeter.

For example, even in a case where the pressure altitude Ap is largely shifted to higher side due to weather or the like and the second absolute altitude A2 is accordingly higher than the second approach altitude AA2 (the condition C12 is unestablished), when the first absolute altitude A1 obtained by the radio altimeter 21 is lower than the first approach altitude AA1 (the condition C11 is established), the condition C1 is established. Also, the error of the first absolute altitude A1 obtained by the radio altimeter 21 may be large depending on the state of the ground surface. Thus, even in a case where the first absolute altitude A1 is largely shifted to higher side and is higher than the first approach altitude AA1 (the condition C11 is unestablished), when the second absolute altitude A2 that is obtained from the pressure altitude Ap and landing site altitude $A_L$ is lower than the second approach altitude AA2 (the condition C12 is established), the condition C1 is established.

As mentioned above, the altitude measurement system that is one of indices of the approach determination is duplexed, which makes it possible to secure reliability of the approach determination.

Next, as the condition C2, an optional condition that indicates the approaching state by being established together with the altitude condition is defined.

As the condition C2, it is possible to favorably adopt a condition based on a position of a thrust lever 15. The thrust lever 15 regulates thrust that is generated by the engine 11.

For example, it is possible to adopt, as the condition C2, a condition that the thrust lever 15 is not located at a position causing thrust necessary for takeoff and climbing. Thus, it is possible to distinguish, based on the position of the thrust lever 15, the approach from takeoff and climbing that indicate the altitude similar to the altitude in approaching. In other words, when the altitude is lower than the approach altitude (the condition C1 is established) as well as the thrust lever 15 is not located at the position causing thrust necessary for takeoff and climbing (the condition C2 is established), it is determined that the aircraft 1 is approaching. On the other hand, when the altitude is lower than the approach altitude (the condition C1 is established) but the thrust lever 15 is located at the position causing thrust necessary for takeoff and climbing (the condition C2 is unestablished), it is not determined that the aircraft 1 is approaching.

When the condition that the thrust lever 15 is not located at the position causing thrust necessary for takeoff and climbing is adopted as the condition C2 as mentioned above, the approach altitudes AA1 and AA2 in the condition C1 may be preferably defined based on a lower limit of the altitude at which the thrust lever 15 is maintained at the position that causes thrust necessary for takeoff and climbing after takeoff or after climbing.

The data of the altitude at which the thrust lever 15 that has been set, in takeoff or climbing, to the position causing thrust necessary for takeoff and climbing is changed to other lever position in the upper sky are collected and analyzed. When the thrust lever 15 is maintained at the position causing thrust necessary for takeoff and climbing until at least the absolute altitude $A_Z$ (see FIG. 4) through the collection and analysis of the altitude data, it is possible to set the approach altitudes AA1 and AA2 to the absolute altitude $A_Z$ or an absolute altitude slightly lower than the absolute altitude $A_Z$.

Thus, it is possible to more surely distinguish approach from takeoff and climbing based on the condition that the thrust lever 15 is not located at the position causing thrust necessary for takeoff and climbing (the condition C2 is established) under the condition that the first absolute altitude A1 or the second absolute altitude A2 is lower than the corresponding approach altitude AA1 or AA2 (the condition C1 is established by the condition C11 or the condition C12).

In the present embodiment, the first approach altitude AA1 is set to the absolute altitude slightly lower than the absolute altitude $A_Z$ with allowance. Also, the second approach altitude AA2 is set to the absolute altitude $A_Z$ that is higher than the first approach altitude AA1 in consideration of pressure variation.

The landing gear state detection section 32 (FIG. 2) detects a position Hp of the handle 12H that controls the landing gear 12 during the flight of the aircraft 1.

The landing gear state detection section 32 acquires the position Hp of the handle 12H from a landing gear operation unit including the handle 12H.

When the approach signal S1 indicating approaching is outputted from the approach determination section 31 as well as the position Hp of the handle 12H detected by the landing gear state detection section 32 indicates that the landing gear 12 is not subjected to the down operation, the warning signal output section 33 outputs a warning signal S2 that indicates the landing gear 12 is not lowered down for approach.

The warning signal S2 is transmitted to a module or another computer system that manages warning of the computer system 20. Then, a warning message is displayed on a screen in the cockpit 14 and a warning sound is emitted by the module or the computer system. This urges the pilot to perform the down operation of the landing gear 12.

The warning signal output section 33 of the present embodiment determines that the down operation is not performed as long as the position of the handle 12H detected by the landing gear state detection section 32 is not located at the position of the down operation. In other words, it is determined that the down operation is not performed when the position of the handle 12H is not acquired due to failure of the landing gear operation unit, in addition to the case where the handle 12H is located at the position of the up operation.

At this time, the case where the handle 12H is located at the position of the up operation corresponds to operation omission, and the case where the position of the handle 12H cannot be acquired corresponds to failure of the landing gear operation unit, which are caused by different factors. Thus, the warning signals different for each factor may be preferably outputted.

In addition, the computer system 20 may preferably have a function of outputting a warning signal when the position of the handle 12H is not matched with the actual position of the landing gear 12 without limitation to approaching. Providing a sensor at a position corresponding to the stored landing gear 12 and at a position corresponding to the deployed landing gear 12 makes it possible to detect whether the landing gear 12 is actually located at the up position or the down position. Even if the handle 12H is subjected to the down operation but the landing gear 12 is not lowered down due to failure of the landing gear actuating apparatus 120 or the landing gear 12, it is possible to give the pilot a warning to urge necessary action.

The pilot confirms the warning, and performs the down operation of the handle 12H if the aircraft 1 is approaching. The warning is automatically canceled by the down operation. If the aircraft 1 is not approaching, the down operation is unnecessary. When the measured altitude is shifted to lower side due to the pressure variation or the state of the radio wave, there may be a case where it is determined that the aircraft 1 is approaching even though the aircraft 1 in fact is not approaching.

In other words, since the logic of the approach determination includes the conditions C11 and C12 that are established when the first absolute altitude A1 or the second absolute altitude A2 is low relative to the corresponding approach altitude AA1 or AA2, it may be determined that the aircraft 1 is approaching even though the aircraft 1 in fact is not approaching, due to shift of the altitude to the lower side. However, the conditions C11 and C12 make it possible to determine the approaching state on safety side, which prevents landing without the landing gear 12 being lowered down.

When the landing gear 12 is lowered down by the down operation, a signal S3 indicating that the landing gear 12 has been lowered down is outputted from the computer system 20. The other computer system uses the signal S3 to determine that the aircraft 1 has shifted to approach phase.

As mentioned above, in the present embodiment, the first absolute altitude A1 determined by the radio altimeter 21 and the second absolute altitude A2 that is obtained from the pressure altitude Ap and the landing site altitude $A_L$ are used for determining approach of the aircraft 1.

At this time, when the radio altimeter 21 is added, and absolute altitudes respectively determined by the two radio altimeters 21 are used, the weight of the aircraft 1 is increased by addition of the radio altimeter, although reliability of the approach determination is secured. In the present embodiment, the second absolute altitude A2 is used that is obtained from both the pressure altitude Ap determined by the barometric altimeter 22 that is necessary for flight of the aircraft 1 and certainly installed and the landing site altitude $A_L$ that is certainly provided to the computer system 20 in flight. Therefore, it is possible to secure reliability of the approach determination by redundancy with the single radio altimeter 21 and to perform the approach determination while suppressing the weight of the aircraft 1.

In addition, using the radio altimeter 21 and the barometric altimeter 22 further improves reliability of the approach determination as compared with the case where the two radio altimeters 21 are used. In the case where the two radio altimeters 21 that have similar measurement principle and similar configurations are used, measurement error or failure may occur on both altimeters due to the similar factor. In contrast, the radio altimeter 21 and the barometric altimeter 22 are different in measurement principle and configuration from each other, which hardly causes measurement error and failure on both altimeters. Therefore, even if one of the radio altimeter 21 and the barometric altimeter 22 is broken, the altitude obtained by the other altimeter is used, which allows for improvement in reliability of the approach determination.

Figure 4:
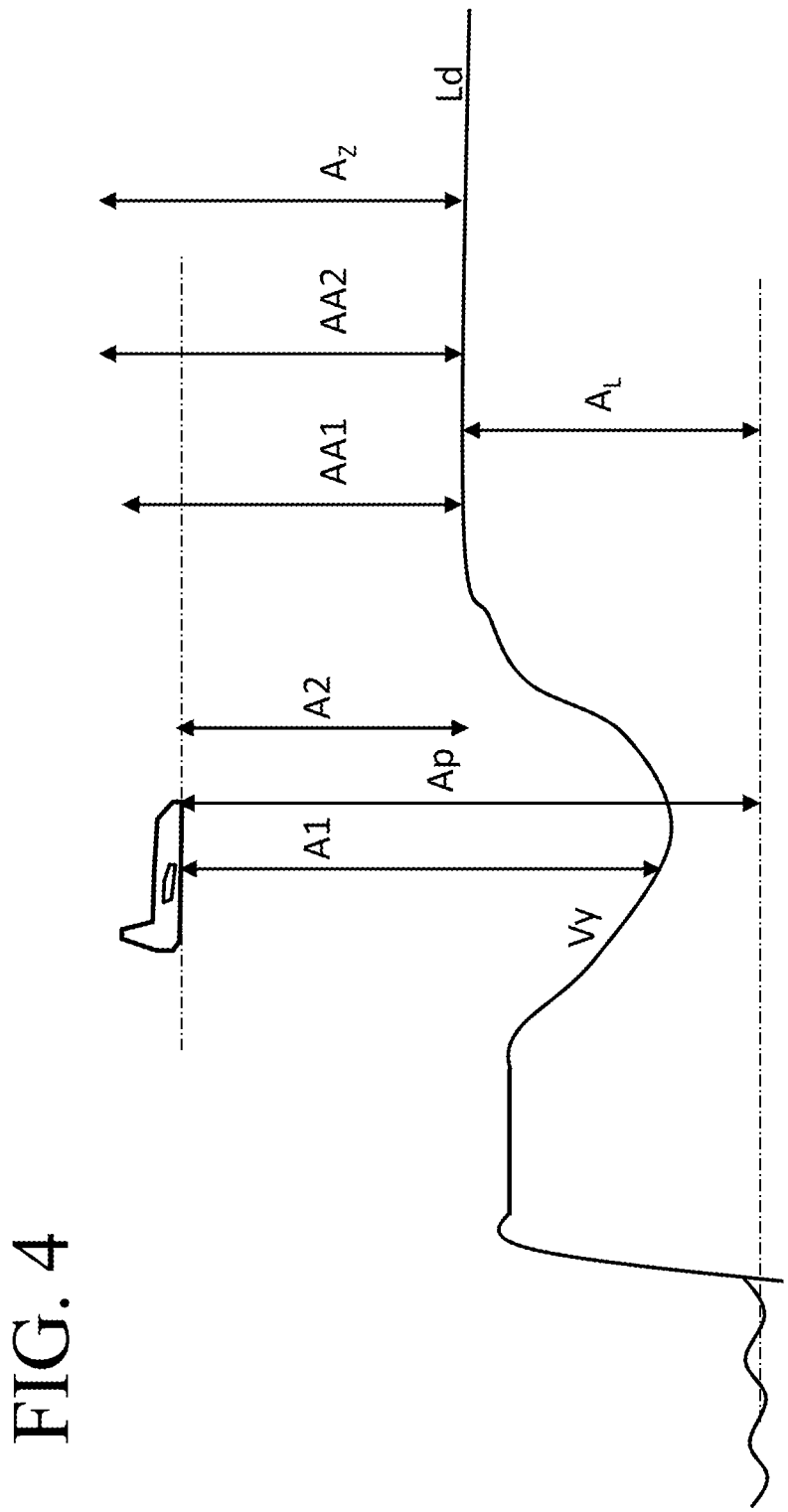
FIG. 4 is a diagram illustrating an example of topography in front of a landing site.

Further, for example, as illustrated in FIG. 4, using the barometric altimeter 22 makes it possible to accurately determine that the aircraft 1 is approaching, even if a valley Vy is opened below the aircraft 1 heading for the landing site Ld.

In a case of such a topography, when the first absolute altitude A1 from the valley floor is measured by the radio altimeter 21, the condition C11 is not established because the first absolute altitude A1 is high relative to the first approach altitude AA1. The condition C1 relating to the altitude, however, is established as a result of establishment of the condition C12 due to the fact that the second absolute altitude A2 that is obtained from the pressure altitude Ap and the altitude $A_L$ of the landing site Ld is low relative to the second approach altitude AA2. Therefore, it is possible to determine approach irrespective of the topography.

In the following, a modification of the above-described embodiment is illustrated.

Figure 5:
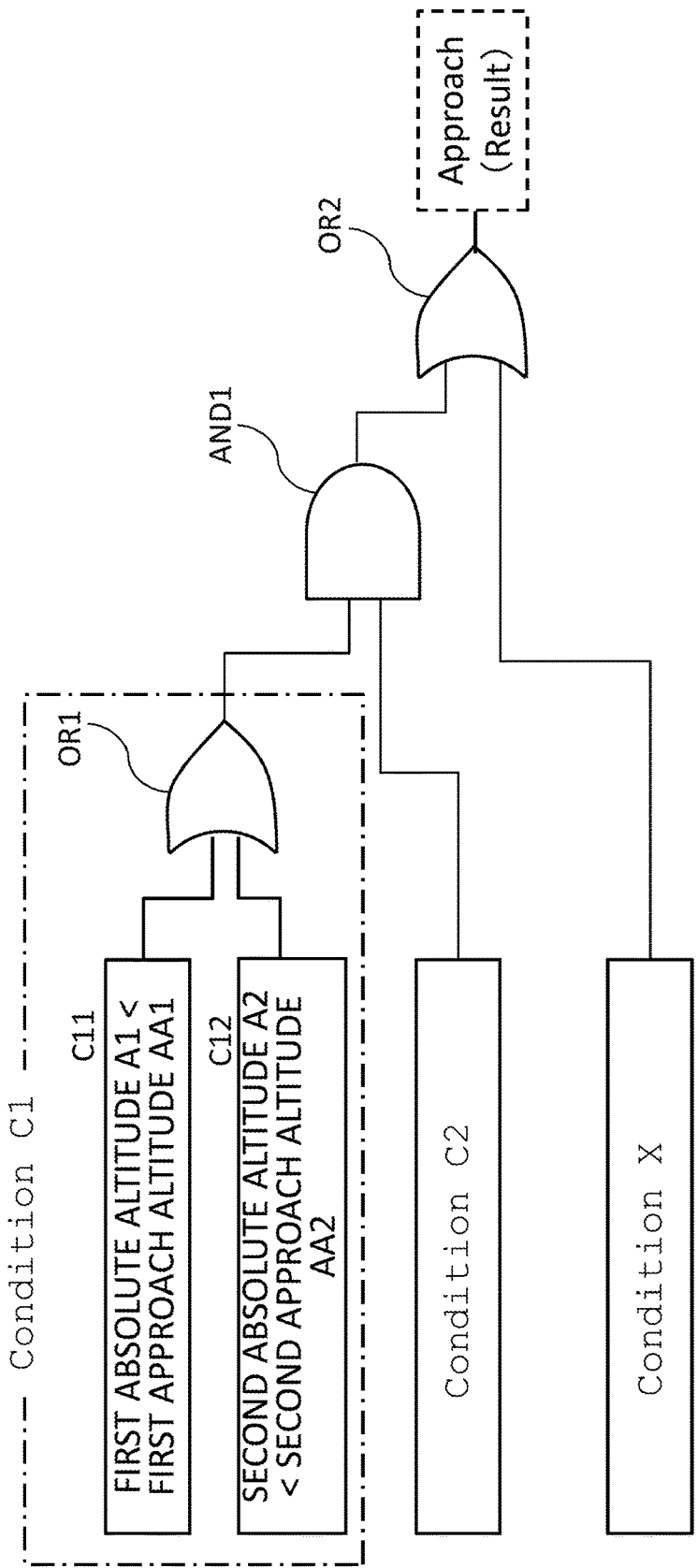
FIG. 5 is a diagram illustrating a modification of the present invention.

FIG. 5 illustrates the processing by the approach determination section 31.

A condition X is coupled with an AND gate AND1 of the above-described condition C1 and condition C2, by an OR gate OR2.

Thus, when the condition X is established, it is determined that the aircraft 1 is approaching (Result), irrespective of the condition C1 and the condition C2.

Further, when both the condition C1 and the condition C2 are established, it is determined that the aircraft 1 is approaching (Result).

As the condition X, it is possible to define an optional condition that represents an approaching state singularly.

As the condition X, it is possible to favorably adopt positions of the flaps and slats that are both flight control surfaces for generating high lift force.

Although the flaps and slats are deployed enough to provide necessary lift force, there is a typical position that is typically used in approaching. Thus, extension of the flaps and slats to the typical position may be adopted as the condition X.

Even when the flaps and slats are not deployed to the typical positions, there is a case corresponding to approach actually. Thus, when the flaps and slats are not deployed to the typical positions, approach may be determined based on the condition C1 and the condition C2.

Other than the above, the configuration described in the aforementioned embodiment may be selected or appropriately modified to other configurations without departing from the scope of the present invention.

For example, in the above-described embodiment, it is possible to add other condition that represents approaching state by being established together with the conditions C1 and C2, and to determine that the aircraft 1 is approaching when all of the conditions C1, C2, and the other condition are established. In other words, it is sufficient to replace the gate OR2 in FIG. 5 with an AND gate AND2.

The logic of the approach determination in the present invention may be optionally structured as long as both the first absolute altitude A1 determined by the radio altimeter 21 and the second absolute altitude A2 that is obtained by subtracting the altitude $A_L$ of the landing site Ld from the pressure altitude Ap determined by the barometric altimeter 22 are used. The respective conditions and the logical gates referenced by the logic are not limited to those of the above-described embodiment.

In addition, in the above-described embodiment, the warning signal indicating that the landing gear 12 has not been lowered down for approach is outputted depending on the factor; however, the warning signal may be outputted collectively without distinguishing the factor.

For example, the present invention may further include one more radio altimeter 21 to use three altimeters, in addition to the radio altimeter 21 and the barometric altimeter 22. As a result, the altitude measurement system is triplicated by the two radio altimeters 21 and the barometric altimeter 22. This makes it possible to further improve reliability of the approach determination.

Figure 6:
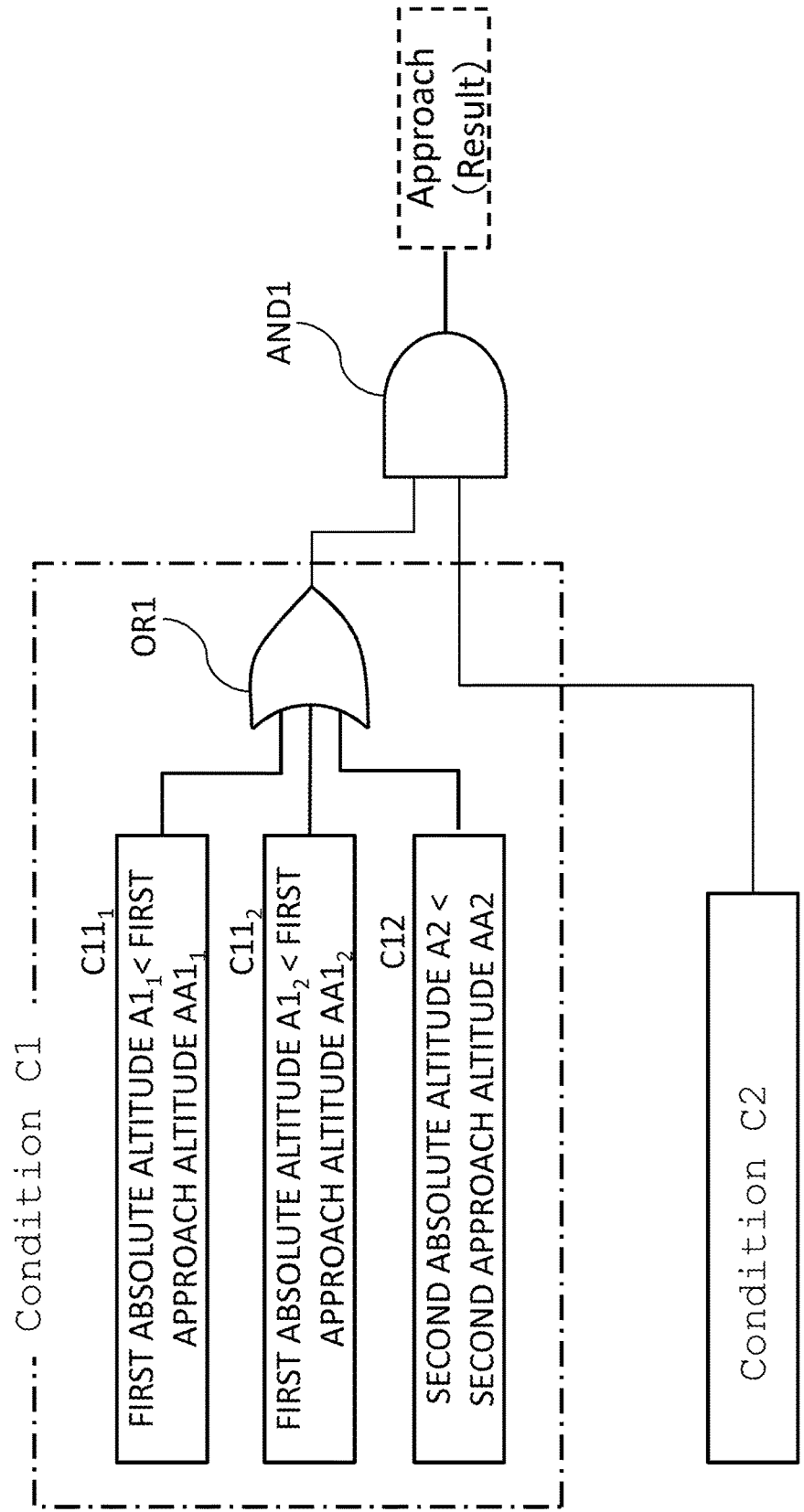
FIG. 6 is a diagram illustrating logic of approach determination according to another modification of the present invention.

In the logic of the approach determination at this time, as illustrated in FIG. 6, the condition C1 may include a condition $C11_1$ that compares a first approach altitude $AA1_1$ with an absolute altitude $A1_1$ determined by one of the two radio altimeters 21 and a condition $C11_2$ that compares a first approach altitude $AA1_2$ with an absolute altitude $A1_2$ determined by the other radio altimeter 21. The first approach altitude $AA1_1$ and the first approach altitude $AA1_2$ may be set to the value same as each other or may be set to values different from each other depending on accuracy of the radio altimeters.

What is claimed is:

1. A computer system provided in an aircraft, the computer system comprising, as modules of a computer program to be executed:

an approach determination section configured to determine whether the aircraft is approaching a landing site;

a landing gear state detection section configured to detect an up state or a down state of landing gear provided in the aircraft; and a warning signal output section configured to output a signal relating to a warning when the approach determination section determines that the aircraft is approaching as well as that the landing gear state based on a detection result of the landing gear state detection section is not the down state, wherein:

in determining whether the aircraft is approaching the landing site, the approach determination section is configured to determine both a first condition and a second condition, the first condition being based on a first absolute altitude determined by a radio altimeter mounted on the aircraft, the second condition being based on a second absolute altitude that is obtained by subtracting an altitude of the landing site from a pressure altitude determined by a barometric altimeter mounted on the aircraft, wherein:

the altitude of the landing site indicates an altitude corresponding to a destination airport, the first condition is established when the first absolute altitude determined by the radio altimeter mounted on the aircraft is low relative to a predetermined first approach altitude, the second condition is established when the second absolute altitude that is obtained by subtracting the altitude of the landing site from the pressure altitude determined by the barometric altimeter mounted on the aircraft is low relative to a predetermined second approach altitude.

2. A computer system provided in an aircraft, the computer system comprising, as a module of a computer program to be executed, an approach determination section configured to determine whether the aircraft is approaching a landing site, wherein:

in determining whether the aircraft is approaching the landing site, the approach determination section is configured to determine a first condition, a second condition, and a third condition, the first condition being based on a first absolute altitude determined by a radio altimeter mounted on the aircraft, the second condition being based on a second absolute altitude that is obtained by subtracting an altitude of the landing site from a pressure altitude determined by a barometric altimeter mounted on the aircraft, and the third condition being based on an absolute altitude determined by another radio altimeter mounted on the aircraft, the altitude of the landing site indicates an altitude corresponding to a destination airport, the first condition is established when the first absolute altitude determined by the radio altimeter mounted on the aircraft is low relative to a predetermined first approach altitude, and the second condition is established when the second absolute altitude that is obtained by subtracting the altitude of the landing site from the pressure altitude determined by the barometric altimeter mounted on the aircraft is low relative to a predetermined second approach altitude.

3. A computer system provided in an aircraft, the computer system comprising, as a module of a computer program to be executed, an approach determination section configured to determine whether the aircraft is approaching a landing site, wherein in determining whether the aircraft is approaching the landing site, the approach determination section is configured to determine both a first condition and a second condition, the first condition being based on a first absolute altitude determined by a radio altimeter mounted on the aircraft, the second condition being based on a second absolute altitude that is obtained by subtracting an altitude of the landing site from a pressure altitude determined by a barometric altimeter mounted on the aircraft, wherein the first condition is established when the first absolute altitude is low relative to a predetermined first approach altitude, and the second condition is established when the second absolute altitude is low relative to a predetermined second approach altitude.

4. An aircraft, comprising:
the computer system according to claim 3;
the barometric altimeter; and
the radio altimeter.

5. The computer system provided in the aircraft according to claim 3, wherein the second approach altitude is higher than the first approach altitude.

6. The computer system provided in the aircraft according to claim 3, wherein in determining whether the aircraft is approaching the landing site, the approach determination section is further configured to determine a third condition that is based on an absolute altitude determined by another radio altimeter mounted on the aircraft, in addition to determining both the first condition and the second condition.

7. The computer system provided in the aircraft according to claim 3, further comprising, as the modules:
a landing gear state detection section configured to detect an up state or a down state of landing gear provided in the aircraft; and
a warning signal output section configured to output a signal relating to a warning when the approach determination section determines that the aircraft is approaching as well as the landing gear state based on a detection result of the landing gear state detection section is not the down state.

8. The computer system provided in the aircraft according to claim 3, further comprising, as modules of a computer program to be executed:
a landing gear state detection section configured to detect an up state or a down state of landing gear provided in the aircraft; and
a warning signal output section configured to output a signal relating to a warning when the approach determination section determines that the aircraft is approaching as well as the landing gear state based on a detection result of the landing gear state detection section is not the down state.

9. An aircraft comprising the computer system according to claim 1.

10. An aircraft comprising the computer system according to claim 2.

11. The computer system provided in the aircraft according to claim 3, wherein the altitude of the landing site indicates an altitude corresponding to a destination airport.

12. The computer system provided in the aircraft according to claim 3, wherein the first approach altitude has a value equal to a value of the second approach altitude.

* * * * *